(12) United States Patent
Blakley et al.

(10) Patent No.: US 6,742,923 B2
(45) Date of Patent: Jun. 1, 2004

(54) SEAL SHAFT SHUTOFF DEVICE AND METHOD

(75) Inventors: Robert A. Blakley, Rochester, NY (US); Bernd Gigas, Churchville, NY (US)

(73) Assignee: SPX Corporation, Charlotte, NC (US)

( * ) Notice: Subject to any disclaimer, the term of this patent is extended or adjusted under 35 U.S.C. 154(b) by 62 days.

(21) Appl. No.: 10/056,027

(22) Filed: Jan. 28, 2002

(65) Prior Publication Data

US 2003/0142585 A1 Jul. 31, 2003

(51) Int. Cl.[7] .............................. B01F 7/16; B01F 13/04; B01F 15/00
(52) U.S. Cl. ..................... 366/331; 277/312; 277/628; 277/630; 277/910
(58) Field of Search ................ 366/331, 348, 366/349; 277/312, 370, 396, 628, 630, 910, 914; 384/901

(56) References Cited

U.S. PATENT DOCUMENTS

| | | | | |
|---|---|---|---|---|
| 3,582,089 A | * | 6/1971 | Amorese | 277/364 |
| 3,758,179 A | * | 9/1973 | Smith | 277/384 |
| 4,047,858 A | * | 9/1977 | Zalis | 418/201.1 |
| 4,071,254 A | | 1/1978 | Raimondi et al. | 277/3 |
| 4,878,677 A | * | 11/1989 | Larkins et al. | 277/511 |
| 5,000,463 A | | 3/1991 | Sun | 277/500 |
| 5,048,847 A | * | 9/1991 | Kovacs et al. | 277/318 |
| 5,078,506 A | * | 1/1992 | Tischer | 366/314 |
| 5,203,574 A | | 4/1993 | Stolzenfeld | 277/6 |
| 5,213,468 A | * | 5/1993 | Sexton et al. | 415/121.3 |
| 5,303,933 A | * | 4/1994 | Larkins | 277/377 |
| 5,690,341 A | * | 11/1997 | Prough et al. | 277/511 |
| 5,772,214 A | * | 6/1998 | Stark | 277/345 |
| 6,193,409 B1 | * | 2/2001 | Brunson et al. | 366/331 |

FOREIGN PATENT DOCUMENTS

| | | | |
|---|---|---|---|
| AU | 41984/85 A | * | 11/1986 |
| CH | 96717 | | 11/1922 |
| DE | 725706 | | 9/1942 |
| FR | 1537874 | | 8/1968 |
| GB | 941241 | | 11/1963 |

OTHER PUBLICATIONS

Manual 32 by Chemineer, "HT Turbine Agitators Installation, Operation Maintenance Manual", 3 pages.
International Searching Authority, International Search Report, Jun. 25, 2003.

* cited by examiner

Primary Examiner—Charles E. Cooley
Assistant Examiner—David L. Sorkin
(74) Attorney, Agent, or Firm—Baker & Hostetler LLP

(57) ABSTRACT

An apparatus for providing a secondary seal on mixers and other rotating equipment that includes a stop assembly and a collar which cooperate to minimize translational movement of a mixer shaft during shutoff and to form a reversible seal between the vessel and the shaft. The apparatus provides a sealing engagement between the mixing vessel and the rotatable shaft of a mixer offering improved safety during mechanical seal replacement.

20 Claims, 8 Drawing Sheets

SEAL SHAFT SHUTOFF DEVICE AND METHOD

FIELD OF THE INVENTION

The present invention relates to a method and apparatus for sealing a mixing vessel. More particularly, the present invention relates to an apparatus for reversibly providing sealing engagement between a vessel and a shaft extending through a wall of the vessel. The invention is useful, for example, for providing a temporary seal during replacement of a mechanical seal, which mechanical seal primarily provides sealing engagement between a mixing vessel and a rotatable shaft.

BACKGROUND OF THE INVENTION

In material processing equipment such as mixers, it is common that a rotatable shaft is positioned through a wall of a mixing vessel. This penetration is commonly located at the centerline of the top head of the mixing vessel, but may also occur in the sidewall or the bottom head. In a typical mixer assembly, a mechanical seal is employed around the rotatable shaft to close off the annulus surrounding the shaft where the shaft passes through the mixing vessel. These seals prevent the material being agitated from escaping. In addition, the seals prevent any gases that may form during the agitation process from escaping.

A mechanical seal typically includes a stationary member fixed to the seal housing and a mating rotatable member attached to the mixer shaft. Seals are generally considered wearing components in a mixing system and must be replaced relatively frequently. Large hydrostatic pressures that can be present inside the vessels and the replacement of mechanical seals under elevated vessel pressure poses safety risks for maintenance personnel. Replacement of the mechanical seal without an additional means of sealing the vessel can allow dangerous gases to escape and can also allow the shaft to be thrust upwards if the vessel is pressurized and no mechanical provision is in place to retain the mixer shaft.

As a result, replacing mechanical seals typically requires depressurization of the mixing vessel to eliminate the very large hydrostatic thrusts and the possibility of vapor release to the atmosphere present in the mixing vessel. The de-pressurization of the mixing vessel can be undesirable for various reasons. First, the process for reducing vessel pressure can be very time consuming. It takes considerable time to cool the vessel. There are also numerous safety procedures for locking out the mixer drive to prevent operation during maintenance. Proper ventilation of the vessel and elimination of dangerous vapor levels is required before vessel entry is permitted. These can result in hours to days of delay depending on the installation specifics. Eliminating downtime must be kept to a minimum because many times a mixer is critical to the operation of an entire plant and down time represents lost production capacity. Second, certain applications require that the mixing vessel not be de-pressurized because it may cause the loss of valuable product or the manufacturing process may require that the materials being agitated remain under constant pressure. The depressurization of the mixing vessel additionally poses environmental concerns, for example, the emissions escaping from the mixing vessel may violate environmental guidelines and/or the contents of the vessel may pose health risks to maintenance personnel.

Current methods for replacing seals without tank de-pressurization attempt to create a temporary, secondary seal but involve partial disassembly of the mixer and necessary shaft translation to engage the shutoff. In order to allow for shaft translation with the current methods, the bearings have to be disconnected from the shaft. The shaft translation can be intentional as a result of operating the shutoff mechanism or it can be unintentional as a result of the hydrostatic pressure in the vessel acting on an unsupported shaft. Regardless, the translational movement poses safety hazards: gross movement upward or downward can result in physical injury to maintenance personnel and because the mixer is at least partly disassembled, gases can escape during shaft translation, prior to formation of the secondary seal. Further, the translational movement imposes wear on secondary seal components and also exposes those components to dirt and corrosive elements. As a result of wear, dirt, and corrosion, if the shaft does not translate sufficiently to create an effective secondary seal, vapors can escape.

For example, to replace cartridge seals, the mixer is disassembled and shaft translation is used during shutoff to create a secondary seal. As a result, vapors can escape from the tank during the delay in forming the seal while the shaft translates or as a result of incomplete translation due to corrosion and dirt. Further, replacement of cartridge seals typically use a common shaft support ring and shutoff collar which only provide for restrained downward movement and unrestrained upward movement. Such an arrangement does not incorporate a positive static shaft seal, which can be checked for positive closure, and positive locked support.

Accordingly, it is desirable to provide a method and apparatus for effectuating a secondary seal which allows a vessel to remain pressurized during the mechanical seal replacement procedure, and which minimizes fugitive emissions to the atmosphere. It is also desirable to provide a method and apparatus for effectuating a secondary seal that does not involve gross translational movement of the shaft or require the bearing support to be disconnected from the shaft for the shutoff to operate. It is also desirable to have a means to safely confirm that the shutoff has occurred. It is also desirable to have an external means for determining that the shaft is properly supported in the shutoff mode. It is further desirable to provide a method and apparatus for effectuating a secondary seal that minimizes exposure of the secondary seal to wear, dirt, and corrosive elements.

SUMMARY OF THE INVENTION

The foregoing needs are met, at least in part, by the present invention where, in one aspect, an apparatus is provided for use with a vessel having a shaft extending therethrough, wherein the apparatus has a stop assembly and a collar which cooperate to minimize translational movement of the shaft during shutoff and to form a reversible seal between the vessel and the shaft. In some embodiments a floating flushing bushing may be incorporated with the apparatus to assist in keeping the apparatus clean.

In another aspect of the invention, a method is provided for minimizing shaft translation during shutoff and for creating a seal in the shutoff position.

The above and other aspects, features and advantages are achieved through the use of novel seal shutoff assemblies as herein disclosed. In accordance with one embodiment of the invention, a seal shutoff apparatus is provided for use with a vessel having a shaft extending therethrough, wherein the seal shutoff apparatus includes a housing having an inner surface and an inward protrusion extending along the entire inner surface of the housing, a collar fixedly disposed on the shaft and protruding into the housing, a hydraulic nut mounted to the housing and a moveable element connected to the hydraulic nut so that the moveable element is axially moveable at least between an operating and shutoff position, wherein the moveable element contacts both the collar and the inward protrusion to form a seal when the moveable element is in the shutoff position.

In accordance with another embodiment of the present invention, the seal shutoff apparatus includes a housing having an inner surface and an inward protrusion extending along the entire inner surface of the housing; a collar fixedly disposed on the shaft and protruding into the housing; a first hydraulic nut mounted to the housing; a second hydraulic nut mounted to the housing; a first moveable element connected to the first hydraulic nut for axial movement at least between an operating position and a shutoff position, wherein the first moveable element is located to one side of the collar and inward protrusion; and a second moveable element connected to the second hydraulic nut for axial movement at least between an operating position and a shutoff position, but located on the opposing side of the collar and inward protrusion, wherein the moveable elements contact both the collar and the inward protrusion to form a seal when the moveable elements are in the shutoff position.

In accordance with yet another embodiment of the invention, a method for forming a reversible seal is provided, wherein the hydraulic nut(s) is(are) actuated to move the shutoff disc from an operating to a shutoff position, resulting in the shutoff disc contacting both the collar and inward protrusion to form a seal.

In yet another embodiment of the present invention, a seal shutoff apparatus for use with a vessel having a shaft extending therethrough, wherein the shaft translates at least between an operating position and a shutoff position, is provided. The seal shutoff apparatus has a stop mechanism and a shaft shutoff collar that cooperate both to constrain translational movement of the shaft and to form a seal between the vessel and the shaft when the shaft is in the shutoff position.

In accordance with yet a further embodiment of the invention, a method of forming a reversible seal is provided, wherein the shaft shutoff collar is moved to the shutoff position causing the collar to contact the stop mechanism thereby creating a seal.

There has thus been outlined, rather broadly, several features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention provides an apparatus for forming a reversible seal to minimize the escape of fugitive emissions through the annulus surrounding a shaft passing through a vessel. By "reversible seal," it is understood that the apparatus has an operating position in which a seal is not formed and a shutoff position in which a seal is formed. The apparatus is preferably used in conjunction with a primary, mechanical seal and is suitable for providing a secondary seal during replacement of the primary, mechanical seal. In such an arrangement, the apparatus is typically in the operating position except when the primary, mechanical seal is being replaced in which case the apparatus is in the shutoff position. In the embodiments depicted, the shutoff assemblies are utilized in combination with an industrial mixer and are shown in a vertical axis typical of top entering mixers. It should be understood, however, that the present invention is not limited in its use to top entering mixers but can be used, for example, with bottom entering or side entering mixers. Furthermore, the present invention is not limited in its application to industrial mixers, but, for example, can be used with other devices having shafts such as pumps, centrifuges, marine applications such as line shafting penetrations in the hull, etc.

Figure 1:
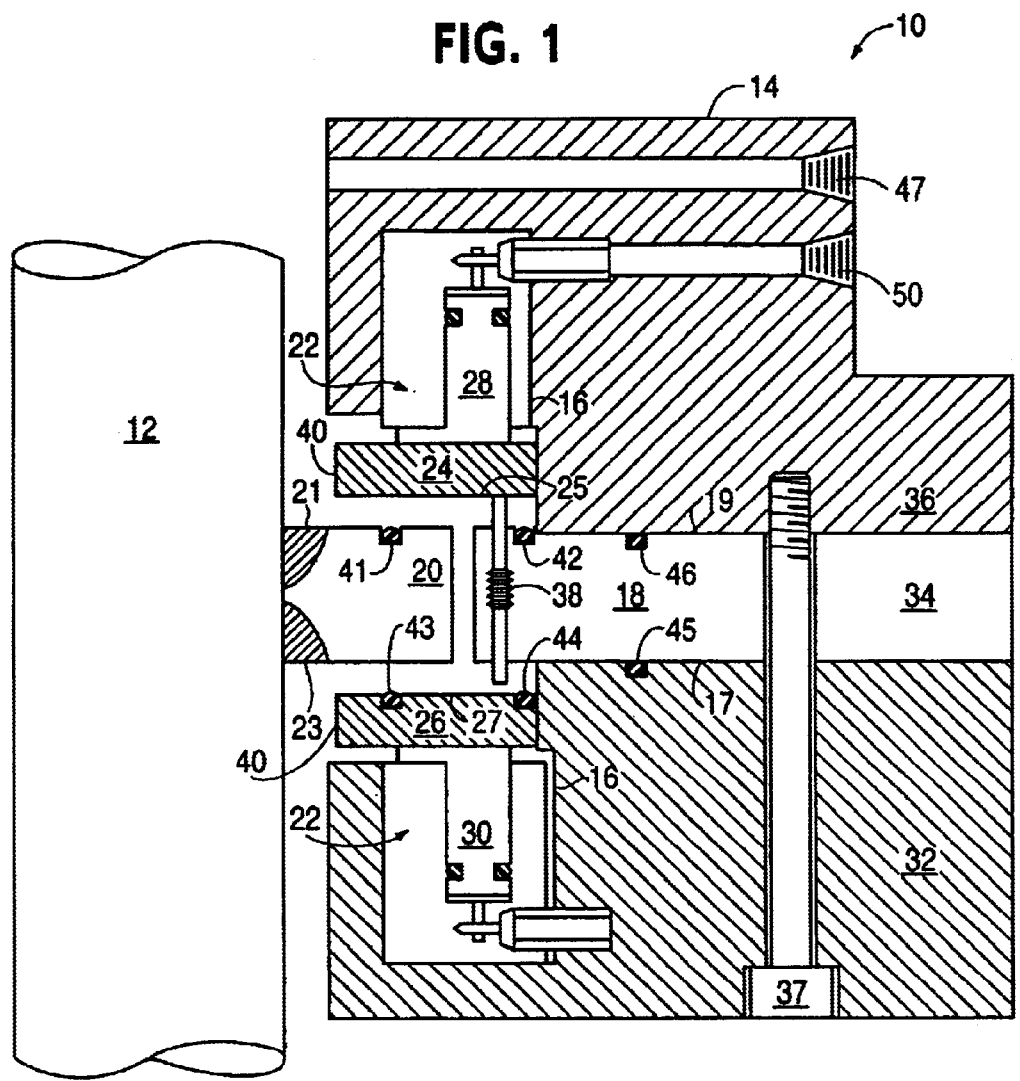
FIG. 1 is a partial cross-sectional view of a seal shaft shutoff apparatus in the operating position in accordance with an embodiment of the present invention.
Figure 2:
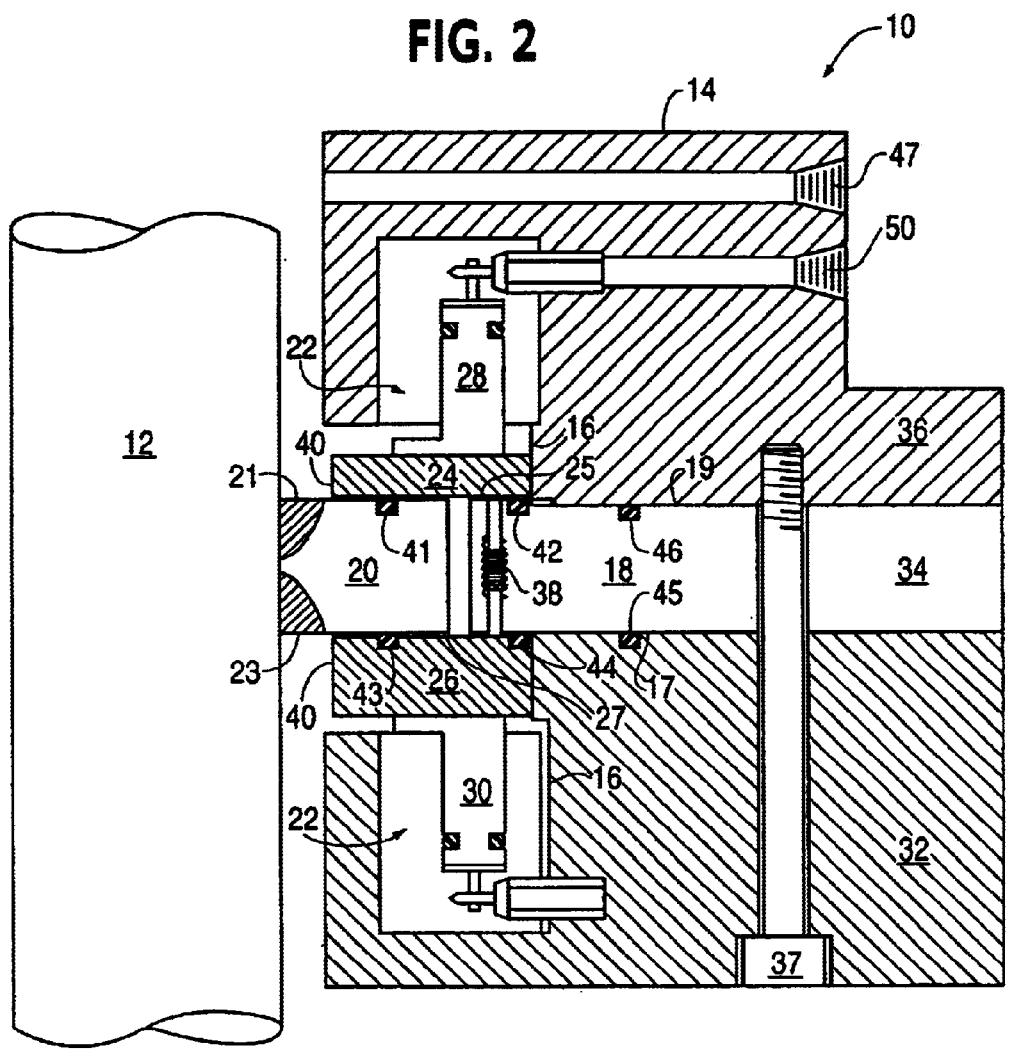
FIG. 2 is a partial cross-sectional view of the apparatus of FIG. 1 in the shutoff position.

Referring now to the figures, wherein like reference numerals indicate like elements, FIGS. 1 and 2 show a partial cross-sectional view of a seal shaft shutoff apparatus 10, in accordance with an embodiment of the invention, disposed on a rotatable shaft 12. Whereas FIG. 1 depicts the apparatus 10 in an operating position, FIG. 2 depicts the apparatus 10 in a shutoff position.

As shown in FIGS. 1 and 2, the apparatus 10 includes a housing 14 having an inner surface 16 and an inward protrusion 18, a collar 20 fixedly disposed on the shaft 12 and protruding into the housing 14, and stop assembly 22 having moveable elements 24, 26 actuated by hydraulic nuts 28, 30 between an operating position (FIG. 1) in which the moveable elements 24, 26 are spaced apart from the collar 20 and the inward protrusion 18 and a shutoff position (FIG. 2) in which the moveable elements 24, 26 sealingly engage both the collar 20 and the inward protrusion 18 simultaneously.

As depicted, the housing 14, which can be a single unit, includes a lower housing 32, a middle housing 34, and an upper housing 36, in addition to the inward protrusion 18. The tri-part structure is for ease of assembly and disassembly. Specifically, the lower housing 32 is detachable from the middle housing 34 for assembly purposes and the lower 32 and middle 34 housings are in turn supported by the upper housing 36 via a bolt 37 or other suitable affixing means known in the art. The upper housing 36 is firmly attached to the mixer at the mixer mounting flange (not shown). Alternatively, the upper housing 36 can be an integral part of the mixer mounting flange. The mixer mounting flange provides a seal between the vessel and housing 14 which alleviates or prevents loss of pressure and/or vapors.

The housing 14, including the lower 32, middle 34, and upper 36 housings are preferably provided by any material suitable for applications where the mixing conditions are conducted under extreme temperatures and/or the materials to be mixed are corrosive. More preferably those materials are wetted metals such as 316 stainless steel and/or titanium.

The inward protrusion 18 extends toward the collar 20 along the entire perimeter of the inner surface 16 of the housing 14. The length of the inner protrusion 18 varies and depends on the width of the housing 14, the distance the collar 20 extends from the shaft 12, and the width of the moveable elements 24, 26. The length of the inner protrusion 18, however, is preferably such that it does not contact the collar 20—allowing the shaft 12 and collar 20 to rotate without providing any wear on the inward protrusion 18—but does overlap the moveable elements 24, 26 as shown in the figures. More preferably, the length is such that even operating shaft runout will not cause contact between the shaft 12 and inward protrusion 18.

The inward protrusion is also preferably provided by any material suitable for applications where the mixing conditions are conducted under extreme temperatures and/or the materials to be mixed are corrosive, for example, wetted metals such as 316 stainless steel and/or titanium. The width of the inner protrusion 18 depends in part on the type of material chosen. The width is preferably such that the given material will not be damaged when squeezed by the pressure exerted by the moveable elements 24, 26.

The collar 20, as the name suggests, encircles the entire circumference of the shaft 12. The collar 20 may be integral with the shaft 12, may be attached by welded fabrication, or may be attached by any means known in the art, such as with set screws and sealed with o-rings. An integral or welded arrangement is generally preferred. However, other attaching means, such as the set screw/o-ring arrangement, can be employed. The length of the collar 20 (i.e. the distance the collar 20 extends into the housing) can vary and depends in part on the length of the moveable elements 24, 26. The collar 20 should be long enough such that it extends between moveable elements 24, 26 and such that, when moveable elements 24, 26 are in the shutoff position, the shaft 12 can be supported. The collar 20, too, is provided by any material suitable for applications where the mixing conditions are conducted under extreme temperatures and/or the materials to be mixed are corrosive, for example, wetted metals such as 316 stainless steel and/or titanium. The width (i.e. the thickness) of the collar 20 depends in part on the material chosen. The width is preferably such that the given material will not be damaged when squeezed by the pressure exerted by the moveable elements 24, 26 in the shutoff position.

As depicted, the stop assembly 22 includes first and second moveable elements 24 and 26 actuated by first and second hydraulic nuts 28 and 30 respectively. The stop assembly 20 can optionally include additional hydraulic nuts and/or biasing means 38 for preventing engagement, such as the illustrated Belleville spring washers.

The first and second moveable elements 24 and 26 are preferably ring-shaped, i.e. have an interior and exterior diameter, but can be any shape as long as they encompass the entire circumference of the shaft 12 and span the gap between the collar 20 and the inward protrusion 18. The moveable elements 24, 26 are preferably sized such that the surface 40 of the interior diameter does not contact the shaft, and such that the distance between the interior diameter and exterior diameter is large enough to span the gap between the collar 20 and the inward protrusion 18. The interior diameter is preferably large enough so that the moveable elements 24, 26 do not contact the shaft 12 even due to accidental lateral (i.e., perpendicular to the shaft centerline) movement of the shaft 12.

While the illustrated embodiment depicts two moveable elements 24, 26 flanking the collar 20 and inward protrusion 18, alternative embodiments and/or modifications having only a single moveable element also fall within the scope of the invention. For example, apparatuses employed on mixing assemblies where it is expected there will be a downward thrust exerted on the shaft only, can operate safely and effectively utilizing a single lower moveable element. Similarly, apparatuses employed on mixing assemblies where it is expected that the shaft will only experience an upward thrust, can be configured with an upper moveable element only and operate safely and effectively. Though embodiments utilizing only a single moveable element are described, the utilization of two moveable elements is preferred from a safety standpoint.

The moveable elements 24, 26 are preferably provided by any material suitable for applications where the mixing conditions are conducted under extreme temperatures and/or the materials to be mixed are corrosive, for example, wetted metals such as 316 stainless steel and/or titanium.

The hydraulic nuts 28, 30 are commercially available. Alternatively, where the commercial products are not appropriate from, for example, a geometry or materials stand point, designs specifically can be made. Custom designed hydraulic nuts are appropriate and preferred for example, for applications where the materials to be mixed are corrosive and can attack the hydraulic nut surfaces. Therefore, corrosive resistant wetted metals such as 316 stainless steel and/or titanium are preferred. In addition, custom geometries can be appropriate where the housing 14 dimensions require that the outer diameter (OD) and/or the inner diameter (ID) of the hydraulic nut be different than that of standard, commercially available hydraulic nuts.

The apparatus 10 can optionally include additional sealing elements 41, 42, 43, 44, 45, 46. Sealing elements 43, 44 are preferably disposed on the surface 27 of moveable element 26 facing the collar 20 and inward protrusion 18, and are in a spaced apart position such that sealing element 43 engages the collar 20 and sealing element 44 engages the inward protrusion 18 when the moveable element 26 is in the shutoff position. Sealing element 41 is disposed on the surface 21 of the collar 20 facing moveable element 24, and is positioned such that it engages the moveable element 24 when the moveable element 24 is in the shutoff position. Sealing element 42 is disposed on the surface 19 of inward protrusion 18 facing moveable element 24 and is positioned so that it engages moveable element 24 when the moveable element 24 is in the shutoff position. Sealing elements 45 and 46 seal the upper, middle, and lower housings to each other.

The illustrated placement of the sealing elements 41, 42, 43, 44 offers ease in manufacture of the sealing elements and, in addition, allows gravity to assist in keeping the sealing elements 41, 42, 43, 44 in position. The sealing elements 41, 42, 43, 44, are preferably O-ring type seals but other means known in the art, including graphite packing and plastic type sealing elements such as TEFLON® vee rings, can be used.

FIGS. 1 and 2 together illustrate operation of the seal shutoff apparatus. As shown in FIG. 1, when the mixer is in use and the shaft is rotating, moveable elements 24, 26 are in the operating position. By operating position, it is understood that the moveable elements 24, 26 are spaced apart from the collar 20 and the inward protrusion 18 so that the shaft 12 can rotate. Preferably, moveable elements 24, 26 do not contact the collar 20 and inward protrusion 18. More preferably, the distance between the surfaces 25, 27 of the moveable elements 24, 26 and the surfaces of the collar 21, 23 and surfaces of the inward protrusion 17, 19 is minimized to limit accidental translational movement of the shaft 12 but large enough so that any runout of the shaft 12 during rotation does not result in accidental contact between collar 20 and the moveable elements 24, 26 resulting in undesirable wear of those components. For industrial mixers having shafts ranging in diameter from about 2" to about 20", the preferred distance ranges from about 0.06" to about 0.19", more preferably ranges from about 0.09" to about 0.15", and is even more preferably about 0.125". Further, the Belleville washers 38 assist in preventing or alleviating the moveable elements 24, 26 from engaging and contacting the collar during operation of the mixer and while the shaft 12 is rotating during mixer operation.

As shown in FIG. 2, when the mixer is shutoff and the shaft 12 stops rotating, the moveable elements 24, 26 are actuated from the operating position to the shutoff position by hydraulic nuts 28, 30. By shutoff position it is understood that the mixer is not in use, the shaft 12 is no longer rotating, and the moveable elements 24, 26 engage the collar 20 and inward protrusion 18. The moveable elements 24, 26 are axially displaced by the pressurization of the hydraulic nuts 28, 30 such that the inner surfaces 25, 27 of the moveable elements are in contact with the first surface 21 and second surface 23 of the collar 20 and the first surface 19 and second surface 17 of the inward protrusion 18. The first surfaces of the collar 20 and inward protrusion 18, 21 and 19 respectively, face the inner surface 25 of the moveable element 24. The second surfaces of the collar 20 and the inward protrusion 18, 23 and 17 respectively, face the inner surface 27 of the moveable element 26. Preferably, the inner surfaces 25 and 27 are in sealing engagement with the respective surfaces of the inner protrusion 17, 19 and the collar 21, 23, form a secondary seal in addition to the mixer's mechanical seal.

External pressurization of the hydraulic nuts 28, 30 results in an axial reaction force on the internal piston of the hydraulic nuts 28, 30 actuating both of the moveable elements 24, 26 until the moveable elements 28, 30 sealingly engage the collar 20 and the inward protrusion 18, thereby providing a reversible, secondary seal between the mixer vessel (not shown) and the shaft 20.

External pressurization to actuate the apparatus 10 allows for continuous monitoring of the apparatus 10 during initial shutoff at a safe distance from the vessel. By the closure of an isolation valve between the external prerssurization source and the apparatus 10 any observed loss of pressure indicates a failure in the hydraulic nut assemblies 28, 30 and therefore a failure in forming the secondary seal, signaling that appropriate action should be taken—for example, depressurizing the mixing vessel—before changing the mixer seal to avoid or alleviate safety hazards. Both the ability to remotely observe potential problems and to take remedial action decrease the likelihood of maintenance personnel coming into contact with the contents of the mixing vessel or being harmed by an unanticipated seal shaft translation.

In addition, the previously described actuation process allows the mixer to remain assembled during the shutoff procedure, minimizing and preferably preventing, maintenance personnel from encountering unanticipated shaft translations during shutoff. Maintaining the integrity of the mixer also allows the tank to remain pressurized and/or closed during the shutoff procedure alleviating and preferably preventing loss of tank pressure and/or escape of harmful vapors.

The present invention contains additional safety features that work both separately and in combination with previously described features. For example, as described above, the moveable elements 24, 26 are preferably spaced apart to minimize unintentional shaft translation to alleviate or avoid physical harm to equipment operators.

Specifically, should there be a loss of hydraulic pressure to the hydraulic nuts 28, 30 together with a net up thrust due to hydrostatic pressure in the mixer being greater than atmospheric pressure, the shaft 12 can be unintentionally displaced upward. However, because translation of the shaft 12 will cause the collar 20 to contact moveable element 24, in turn resulting in translation of moveable element 24 and compression of the piston in hydraulic nut 28 until the stroke of the piston is exhausted, unintentional shaft translation can be minimized. Specifically, the shaft 12 will only translate as far as the combination of the distance between the surface 21 of the collar 20 and the surface 25 of the moveable element 24 and the distance the piston compresses. For an industrial mixer having an approximate shaft diameter within the range of 2.0"–20.0", shaft translation is preferably limited to a range of from about 0.06" to about 0.19", is more preferably limited to a range of from about 0.09" to about 0.15", and is even more preferably limited to about 0.125". As an additional benefit, close clearance between the parts can minimize the loss of tank pressure and vapor emission.

Similarly, should there be a loss of hydraulic pressure to the hydraulic nuts 28, 30 and a resulting net downward thrust on the shaft 12, downward movement of the shaft 12 will be constrained by the collar 20 contacting moveable element 26 which in turn compresses the piston in hydraulic nut 30 until it rests against the lower housing 32. For the same industrial mixer described in the previous paragraph, shaft translation is again preferably limited to a range of from about 0.06" to about 0.19", and is more preferably limited to a range of from about 0.09" to about 0.15", and is even more preferably limited to about 0.125".

An optional pressure tap 47, shown in FIGS. 1 and 2 provides yet an additional failsafe mechanism. The optional pressure tap 47, located in the upper housing 36, allows maintenance personnel to monitor the performance of the shutoff after it is engaged to make certain that all sealing elements are functioning properly and that it is safe to proceed with the mechanical seal replacement. Any increase in pressure sensed at the pressure tap 47 would indicate that the shutoff apparatus 10 is not functioning correctly. This pressure tap is also used to initially relieve captured pressure between the shutoff apparatus and the mechanical seal.

The pressure tap 47 employs a release valve and pressure gauge, both of which are integral to the pressure tap structure. The pressure tap 47 works by first activating the shutoff assembly 10. After the assembly 10 is activated, the release valve of the pressure cap may be opened, releasing gas pressure trapped within the assembly 10. Initially the gas pressure released may be significant, but it should subside substantially to that of the ambient atmospheric pressure. This occurrence indicates that the sealing elements 41, 42, 43, 44 and moveable elements 24, 26 are functioning properly and the mechanical seal may be removed safely. However, if a condition occurs where the gas release remains constant and fails to subside, this is indicative of the sealing elements and moveable elements failing to function properly, alerting maintenance personnel that the mechanical seal can not be removed safely.

Figure 3:
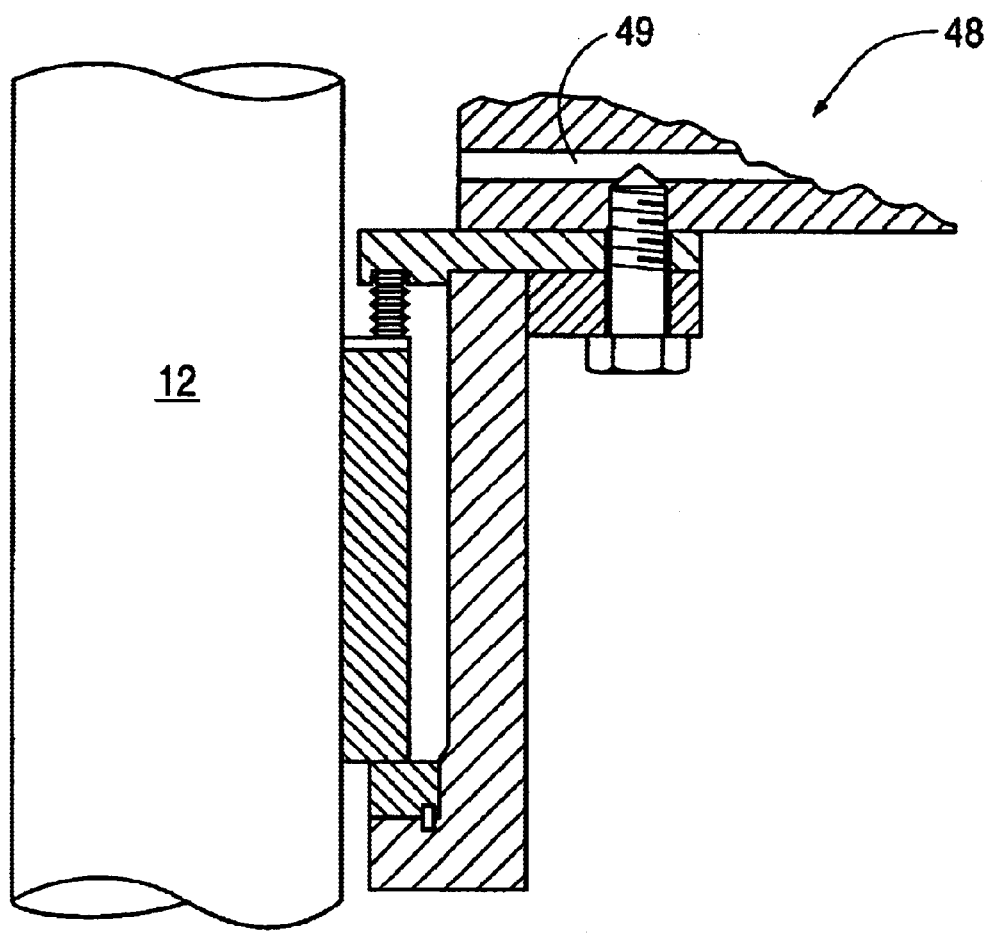
FIG. 3 is an exploded cross-sectional view of a floating flushing bushing which can be used in combination with embodiments of the present invention.

FIG. 3 illustrates a standard floating flushing bushing 48, which is preferably positioned in close clearance to the shaft 12. Preferably, the bushing is positioned in a range of from about 0.001" to about 0.003" from the shaft. The bushing 48 is also preferably operationally connected to the apparatus so that it deflects radially with the movement of the shaft 12 to prevent wear.

The bushing 48 can also function to keep the assembly 10 and the mixer seal clean during mixer operation, which can help maintain proper sealing of the apparatus 10 over time. Cleanliness is maintained both by the bushing 48 being positioned in close clearance to the shaft 12, thus alleviating the problem of dirt and corrosive elements contacting the sealing elements, and also by being used cooperatively with a flushing vent 49, which vent 49 delivers liquid to the spaces surrounding the bushing 48, including between the bushing 48 and shaft 49. Preferably, the standard floating flushing bushing 48 is used in combination the with seal shaft shutoff apparatus, however the bushing is not required for the apparatus to function properly.

Figure 4:
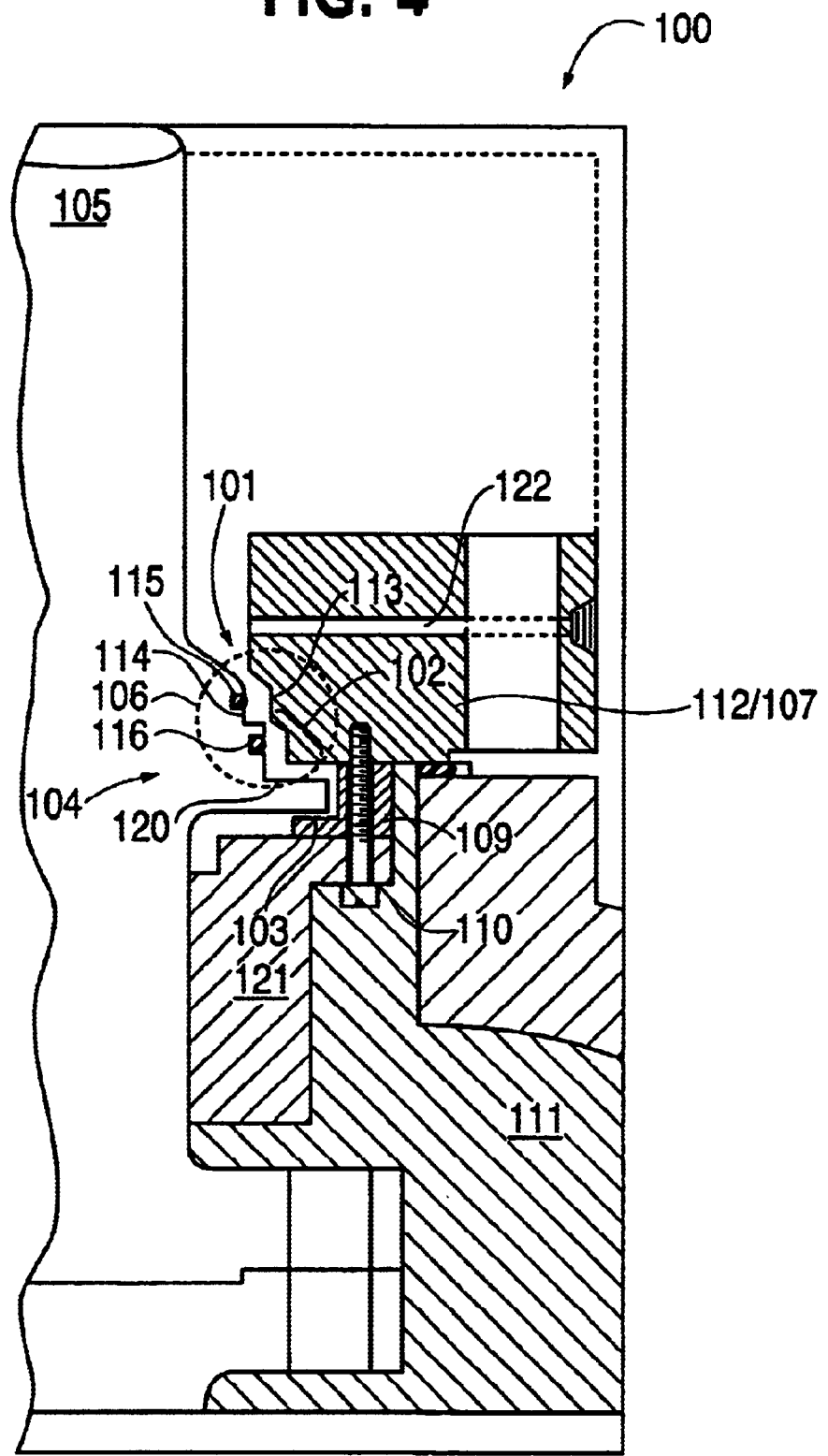
FIG. 4 is a partial cross-sectional view of a seal shaft shutoff apparatus in the operating position in accordance with another embodiment of the present invention.
Figure 5:
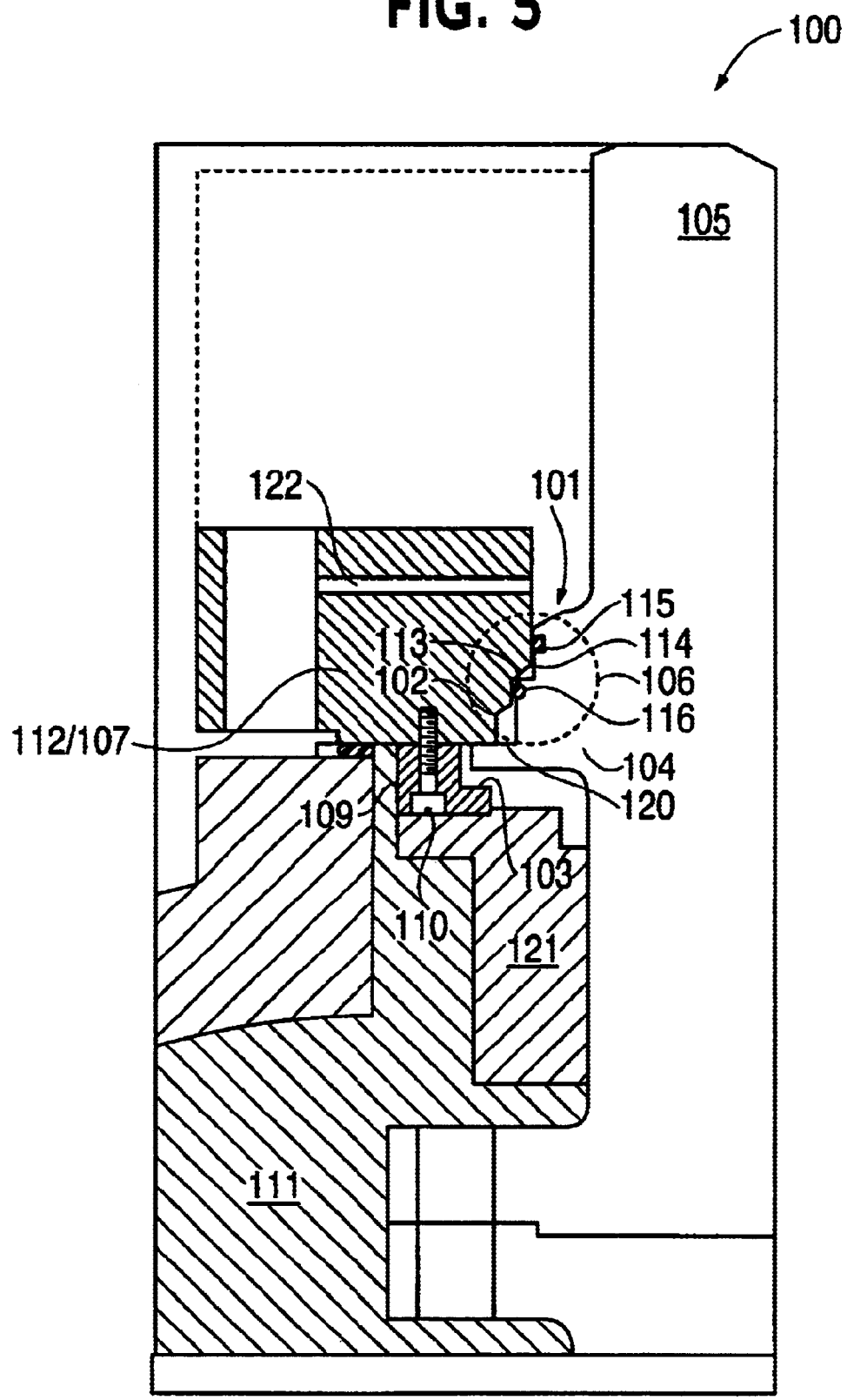
FIG. 5 is a partial cross-sectional view of the apparatus in FIG. 4 in the shutoff position.

Referring now to FIGS. 4 and 5, a partial cross-sectional view of a seal shaft shutoff apparatus 100, disposed around a rotatable shaft 105, is shown in accordance with an alternative embodiment of the present invention. Whereas FIG. 4 depicts the apparatus 100 in an operating position, FIG. 5 depicts the apparatus 100 in a shutoff position.

As shown in FIGS. 4 and 5, the apparatus 100 includes a stop assembly 101 having first contact surface 102 spaced apart from a second contact surface 103, a collar 104 fixedly disposed on a shaft 105, and a sealing mechanism 106.

The stop assembly 101 can be a single unit. As depicted, however, the stop assembly 101 comprises a first component 107 including the first contact surface 102, attached to a second component 109 including the second contact surface 103. The first and second components 107, 109 can be attached together by any means known in the art, for example by a bolt 110.

The stop assembly 101, which is sealingly mounted to the vessel 111, extends inward, toward the shaft 105, along the entire perimeter of the vessel 111. In the embodiment shown, the sealing engagement is accomplished by having the mechanical seal mounting flange 112 also function as the first component 107 having the first contact surface 102. In other words, in the illustrated embodiment, the first contact surface 102 is integral with the mechanical seal mounting flange 112.

The collar 104 encircles the entire circumference of the shaft 105. Preferably, it is integral with the shaft 105, however the collar 104 may be attached by welded fabrication, set screws or any other means known in the art.

The collar 104 is provided by any material, for example, wetted metals such as 316 stainless steel and/or titanium, suitable for extreme temperature mixing applications and/ applications where the materials to be mixed are corrosive and can attack the collar 104.

The sealing mechanism 106 can be a separate mechanism, or as depicted, can be integral with the stop assembly 101 and collar 104. In the integral arrangement shown, the sealing mechanism 106 includes first notched surface 113, which can be considered a portion of the first contact surface 102, second notched surface 114, and optional sealing element elements 115, 116. Optional sealing elements 115, 116 are preferably positioned on second notched surface 114, thus allowing gravity to assist in keeping the sealing elements 115, 116 in position; and such that when the collar 104 is in shutoff position, sealing elements 115, 116 engage the first notched surface 113. Sealing elements 115, 116 are preferably o-ring type seals but other means known in the art, including graphite packing and plastic-type sealing elements such as TEFLON® vee rings may be used.

It should be noted that the position of the sealing mechanism 106 and arrangement of notched surfaces 113, 114 and sealing elements 115, 116 shown is that preferred for top entering mixers for which upward shaft translation is expected. Thus, for example, for top entering mixers in which downward shaft translation is expected, the sealing mechanism 106 would preferably be located below or integral with the second contact surface 103.

It should also be noted that alternative integral assemblies are also within the scope of the invention. For example, an integral sealing assembly could merely include the flat portion of first contact surface 102, a surface 120 of the collar 104 opposing the flat portion of first contact surface 102, and at least one optional, additional sealing element (not shown) such as an o-ring disposed on flat portion of surface 120.

The seal shaft shutoff assembly 100 optionally includes a floating flushing bushing 121 and flushing vent 122. As discussed above, FIG. 3 illustrates a standard floating flushing bushing. The bushing 121, particularly in conjunction with the flushing vent 122, functions to keep the stop assembly 101 clean during mixer operation by alleviating or preventing dirt and corrosive elements from coming in contact with the sealing elements and opposing surfaces of the collar and stop assembly.

Again, as in the previously described embodiment, the bushing 121 is spaced apart from the shaft and preferably operationally connected to the assembly 101 so that it deflects radially with the movement of the shaft 105 to maintain a spaced apart position relative to the shaft thereby preventing or alleviating wear. For example, the bushing 121 can be connected to the stop assembly 101 by the bolt 110. Also as discussed above, the bushing is also positioned in close clearance from the shaft 105, in a range of from about 0.001" to about 0.003" from the shaft 105.

Preferably, the floating flushing bushing is used in combination the with seal shaft shutoff apparatus, however the bushing is not required for the apparatus to function properly.

FIGS. 4 and 5 together illustrate operation of the seal shutoff apparatus 100. As shown in FIG. 4, when the mixer is in use and the shaft 105 is rotating, the collar 104 is in operating position. By operating position, it is understood that the collar 104 is spaced apart from the stop assembly 101. Preferably, the distance between the collar 104 and the stop assembly 101 is minimized to limit translation of the shaft 105 but large enough so that wobbling of the shaft 105 during rotation does not result in accidental contact between the collar 104 and the stop assembly 101. For industrial mixers with shaft diameters between 2.0"–20.0", this distance preferably ranges from about 0.06" to about 0.19". More preferably the distance ranges from about 0.09" to about 0.15". Even more preferably, the distance is about 0.125".

As shown in FIG. 5, when the mixer is shutoff, the shaft 105 translates, displacing the collar 104 from the operating position to the shutoff position. Shaft translation can be, in the case of a top entering mixer, either upward or downward resulting from a pulling or pushing force exerted by an external device (not shown), upward as a result of hydrostatic pressure in the mixer, or downward as a result of gravity. It should be noted that when an external device is used, preferably hydrostatic pressure assists in raising the shaft into an upward shutoff position, or gravity assists in lowering the shaft into a downward shutoff position. By shutoff position, it is understood that the collar 104 engages either the first contact surface 102 as in the case of upward translation, or the second contact surface 103, as in the case of downward translation, and the sealing mechanism is engaged.

Accordingly, as shown in FIGS. 4 and 5, the stop assembly 101 cooperates with the collar 104 to minimize shaft translational movement—both intentional and unintentional. For industrial mixers having shaft diameters between 2.0"–20.0", this distance preferably ranges from about 0.19" to about 0.38". More preferably the distance ranges from about 0.20" to about 0.27". Even more preferably, the distance is about 0.25".

Figure 6:
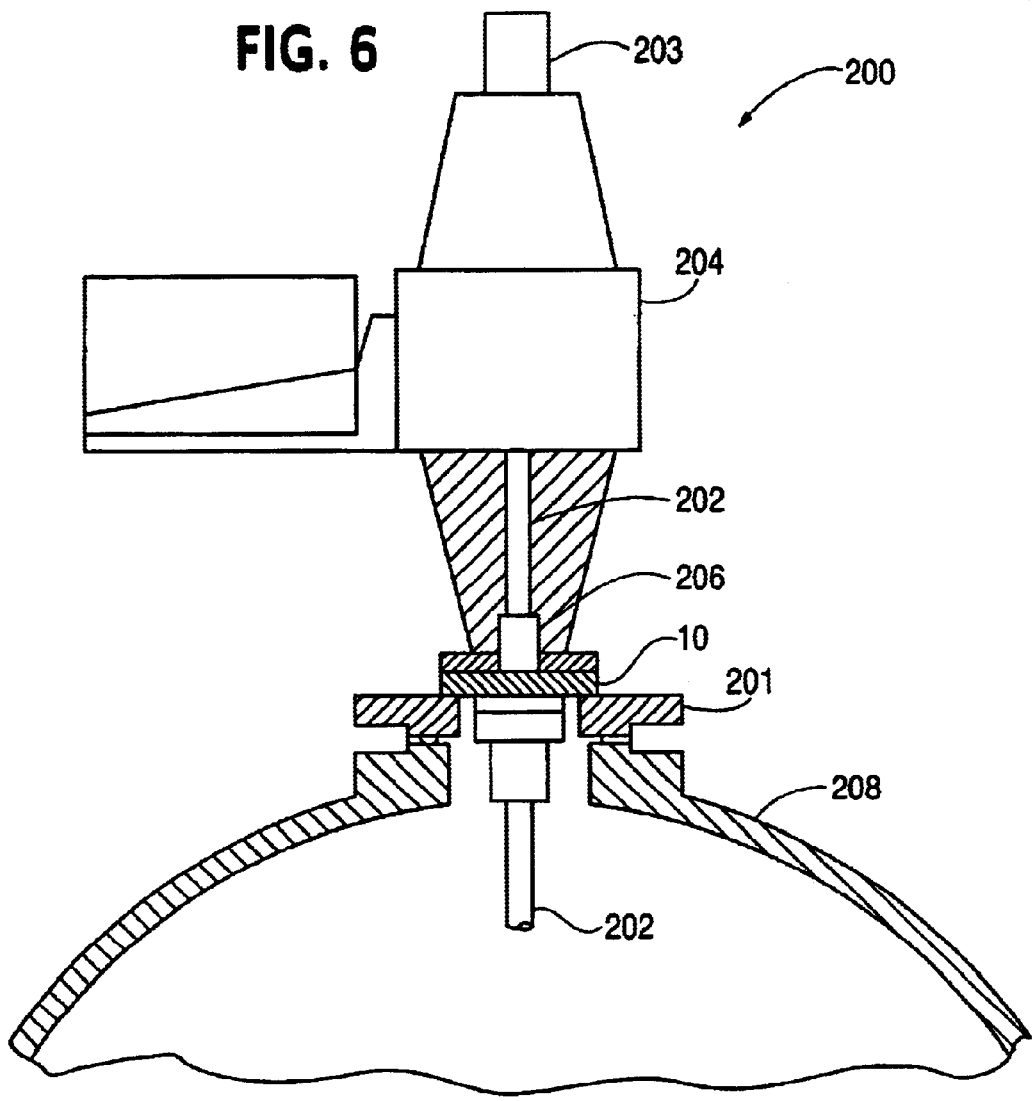
FIG. 6 is a side view of a mixer employing a mixer seal shaft shutoff apparatus in accordance with the present invention.

Referring now to FIG. 6, a mixer 200 employing a seal shaft shutoff apparatus 10 in accordance with the present invention is illustrated. The mixer 200 includes a rotatable shaft 202 that extends from a driving means 204 such as a motor driven geardrive. The shaft 202 proceeds to pass through the mixer seal 206 and onto the shutoff assembly 10, where it extends through the assembly 10 and eventually penetrates the mixing vessel 208. A puller assembly 203 is used to move the shaft 202 up and down as necessary during the seal cartridge replacement. A mixer mounting flange 201 supports the mixer and the shutoff aparatus 10 while sealing the vessel 208 to the outside. The mixer mounting flange is not disturbed or removed in any way during the replacement of the seal cartridge 206. It also contains the pressure connections for the pressure tap 47 and the hydraulic nut pressure ports 50.

Figure 7:
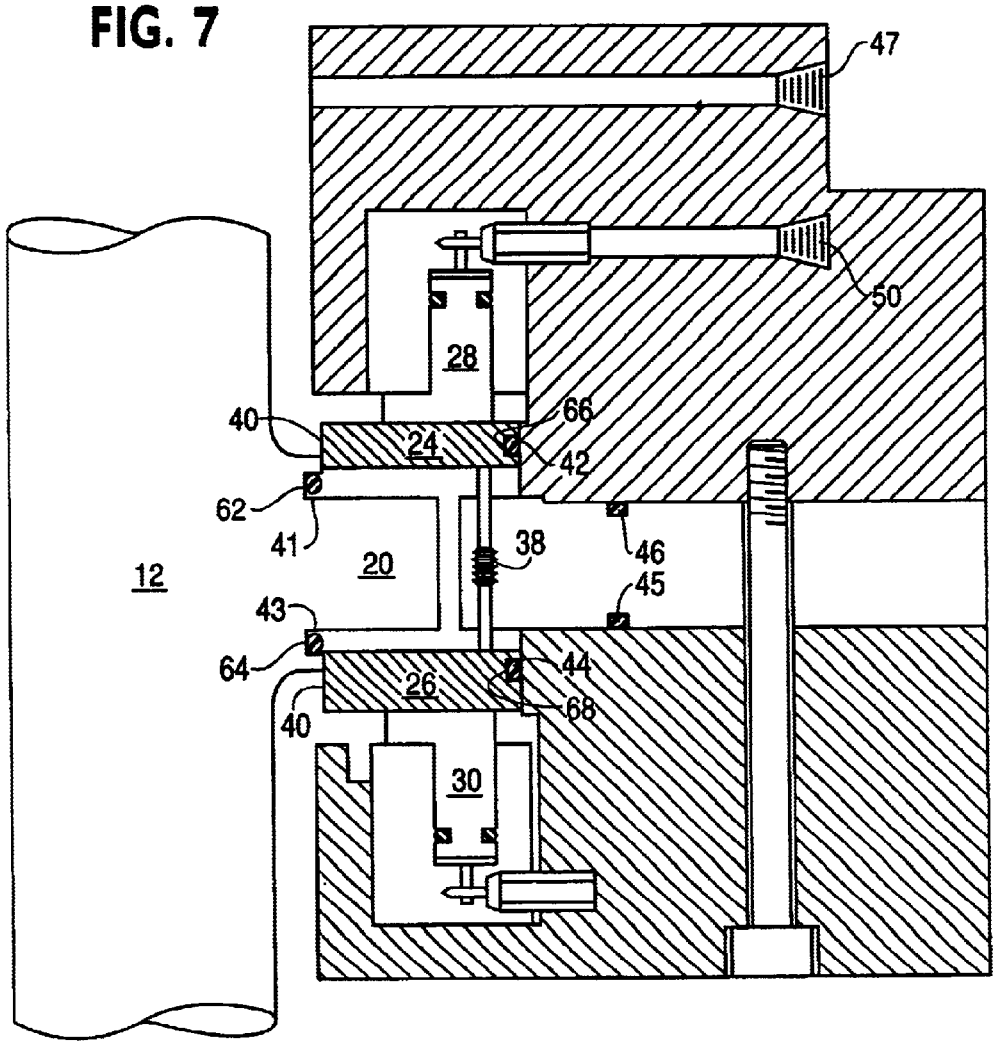
FIG. 7 is a partial cross-sectional view of a seal shaft shutoff apparatus in the operating position in accordance with another embodiment of the present invention.
Figure 8:
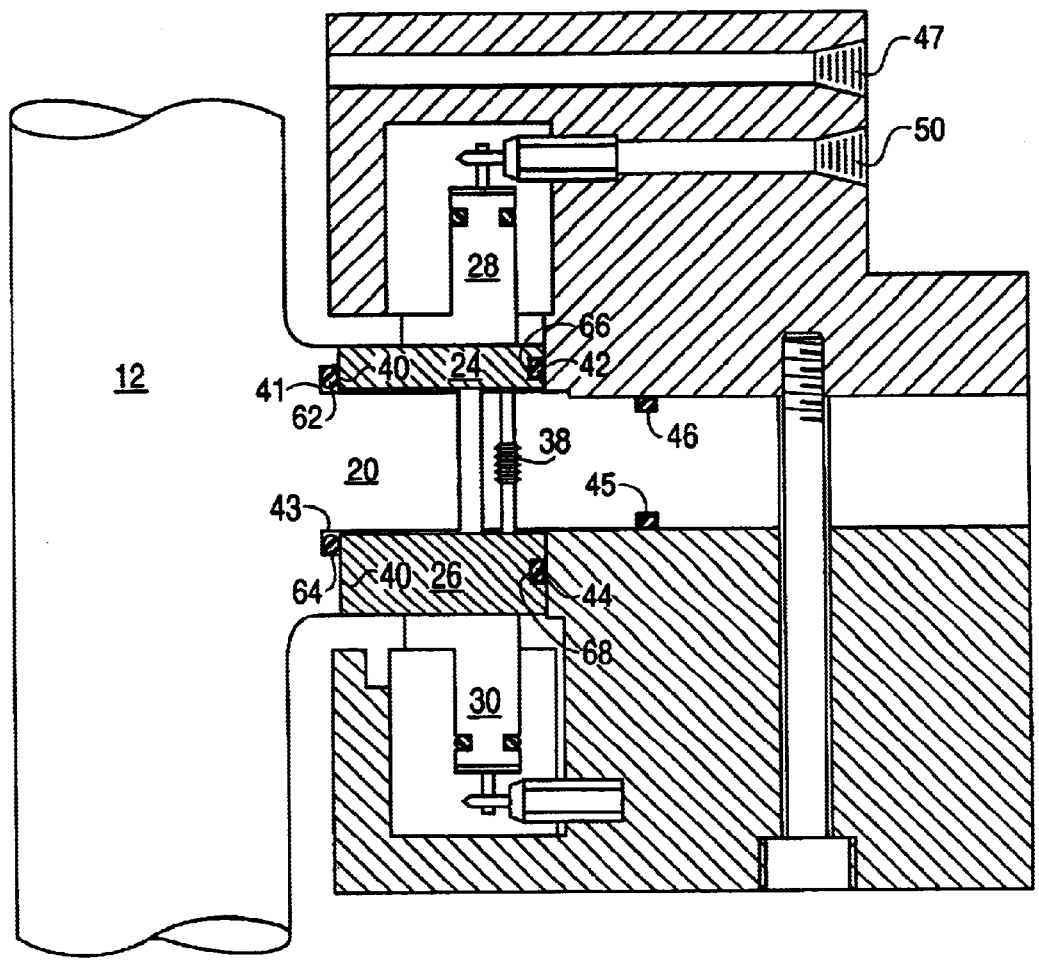
FIG. 8 is a partial cross-sectional view of the apparatus in FIG. 7 in the shutoff position.

Referring now to FIGS. 7 and 8, a partial cross-sectional view of a seal shaft shutoff apparatus 10, disposed around a rotatable shaft 12, is shown in accordance with an alternative embodiment of the present invention. Whereas FIG. 7 depicts the apparatus in the operating position, FIG. 8 depicts the apparatus 10 in the shutoff position. Unlike the previously described embodiments, FIGS. 7 and 8 illustrate an alternative sealing element 41, 42, 43, 44 arrangement. As illustrated, the collar 20 has an upper shoulder and a lower shoulder. Both shoulders have a groove 62 and 64 within which sealing elements 41 and 43 are disposed. In addition, sealing elements 43 and 44 are disposed within grooves 66 and 68 of moveable elements 24 and 26 such that sealing element 42 contacts the upper housing 36 of the apparatus and sealing element 44 contacts the lower housing 32 of the apparatus. This arrangement may preferably be utilized where gravity is incapable or is not expected to assist in keeping the sealing elements in position.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. For example, while the illustrated embodiments are discussed in the context of providing a seal around the annulus of a shaft, a person of ordinary skill should recognize that the assembly can be configured to provide a seal in other contexts.

As another example, a person of ordinary skill should recognize that the assembly can be used simply to support a shaft in shutoff position. For such a use, the collar may not extend the entire circumference of the shaft, the inward protrusion may extend only partially along the circumference of the inner surface of the housing, may be comprised of several intermittent inward protrusions or may be eliminated altogether, and the stop assembly may only engage and need not sealingly engage the collar and/or inward protrusion if present.

As yet another example, while FIGS. 1 and 2 indicate that the collar 20 and inward protrusion 18 are positioned in the same plane and perpendicular to both the shaft 12 and housing 14, collar 20 and inward protrusion 18 may in fact be in separate planes and in non-parallel arrangement. In such a configuration, moveable elements 24, 26 would be shaped so that in shutoff position they would preferably be in sealing engagement with both the collar 20 and inward protrusion 18.

What is claimed is:

1. An apparatus for use with a vessel having a rotatable shaft therethrough, the apparatus comprising:
   a collar disposed on the shaft wherein said collar rotates with the shaft;
   a housing having an inward protrusion;
   at least one first hydraulic nut mounted on the housing;
   a first moveable element connected to the at least one first hydraulic nut so that the first moveable element is axially moveable between an operating and shutoff position; and
   a plurality of sealing elements for sealingly engaging the first moveable element to the collar and inward protrusion when the first moveable element is in the shutoff position,
   wherein the first moveable element contacts both the collar and the inward protrusion when the first moveable element is in the shutoff position to form a seal when the first moveable element is in the shutoff position.

2. An apparatus according to claim 1, wherein the sealing elements are O-rings.

3. An apparatus according to claim 1, wherein the housing further comprises:
   a lower portion;
   a middle portion; and
   an upper portion,
   wherein the lower portion is affixed to the middle portion, the middle portion is affixed to the upper portion and the upper portion is affixed to the vessel.

4. An apparatus according to claim 1, wherein the collar is integral with the shaft.

5. An apparatus according to claim 1, wherein the collar is attached to the shaft by an attaching means.

6. An apparatus according to claim 5, wherein the attaching means is weld fabrication and/or set screws.

7. An apparatus for use with a vessel having a rotatable shaft therethrough, the apparatus comprising:
- a collar disposed on the shaft wherein said collar rotates with the shaft;
- a housing having an inward protrusion;
- at least one first hydraulic nut mounted on the housing;
- a first moveable element connected to the at least one first hydraulic nut so that the first moveable element is axially moveable between an operating and shutoff position, wherein the first moveable element contacts both the collar and the inward protrusion when the first moveable element is in the shutoff position; and
- at least one second hydraulic nut mounted on the housing; and
- a second moveable element connected to the at least one second hydraulic nut so that the second moveable element is axially moveable between an operating and shutoff position,
- wherein the first moveable element, connected to the at least one first hydraulic nut, faces a first side of the inward protrusion and collar; the second moveable element, connected to the at least one second hydraulic nut, faces a second side of the inward protrusion and collar; and the second moveable element contacts the second side of both the collar and the inward protrusion when the second moveable element is in the shutoff position.

8. An apparatus according to claim 7, wherein the first moveable element sealingly contacts the first side of both the collar and the inward protrusion and the second moveable element sealingly contacts the second side of both the collar and inward protrusion when the first and second moveable element are in the shutoff position.

9. An apparatus according to claim 8, wherein the distance between the first moveable element and the collar ranges from about 0.06" to about 0.19" and the distance between the second moveable element and the collar ranges from about 0.06" to about 0.19" when the first and second moveable elements are in the operating position.

10. An apparatus according to claim 9, wherein the distance between the first moveable element and the collar is about 0.125" and the distance between the second moveable element and the collar is about 0.125" when the first and second moveable elements are in the operating position.

11. An apparatus according to claim 7, further comprising a biasing means connected to the moveable elements, wherein the biasing means extends between the moveable elements.

12. An apparatus according to claim 7, further comprising a plurality of sealing elements for sealingly engaging the first and second moveable elements to the collar and inward protrusion when the first and second moveable elements are in the shutoff position.

13. An apparatus according to claim 11, wherein the sealing elements are O-rings.

14. An apparatus according to claim 7, further comprising a pressure tap for monitoring the function of the hydraulic nuts, wherein the pressure tap comprises a pressure gauge and a release valve.

15. An apparatus according to claim 7, further comprising a floating flushing bushing.

16. An apparatus according to claim 15, wherein the floating flushing bushing is positioned a distance away from the shaft ranging from about 0.001" about 0.003".

17. A mixing apparatus for mixing and processing materials comprising:
- a mixing vessel configured for receiving material to be mixed;
- a motor;
- a rotatable shaft extending from the motor and into the mixing vessel;
- a sealing element for providing a primary sealing engagement between the vessel and the rotatable shaft; and
- a seal shutoff apparatus having an operating and shutoff position, wherein the seal shutoff apparatus provides a secondary seal between the vessel and the rotatable shaft when in the shutoff position, the seal shutoff apparatus comprising a housing having an inward protrusion, the housing being attached to the vessel; at least one hydraulic nut mounted to the housing; at least one moveable element attached to the at least one hydraulic nut; a collar disposed on the shaft which rotates with the shaft and protruding into the housing, and a plurality of sealing elements for sealingly engaging the first moveable element to the collar and inward protrusion when the first moveable element is in the shutoff position.

18. A mixing apparatus according to claim 17, wherein the seal shutoff apparatus further comprises a floating flushing bushing.

19. A method for providing a sealing engagement between a vessel and a rotatable shaft comprising:
- providing a seal shaft shutoff apparatus having a collar disposed on the shaft, a housing having an inward protrusion, at least one first hydraulic nut mounted on the housing, a first moveable element connected to the first hydraulic nut, at least one second hydraulic nut mounted on the housing, a second moveable element connected to the second hydraulic nut;
- actuating the at least one first hydraulic nut, thereby displacing the first moveable element to contact a first side of both the collar and the inward protrusion to form a seal; and
- actuating the at least one second hydraulic nut, thereby displacing the second moveable element to contact a second side of both the collar and the inward protrusion to form a seal.

20. A seal shaft shutoff apparatus for providing reversible sealing engagement between a vessel and a rotatable shaft, the apparatus comprising:
- a first stationary sealing means disposed on the shaft, wherein the first stationary sealing means rotates with the shaft;
- a second stationary sealing means disposed within a housing;
- a first moveable sealing means connected to a first actuation means for axially displacing the first movable sealing means to sealingly contact both the first stationary sealing means and the second stationary sealing means to form a seal, wherein the actuating means is mounted in the housing; and
- a second moveable sealing means connected to a second actuating means for axially displacing the second moveable sealing means to sealingly contact both the first stationary sealing means and the second stationary sealing means to form a seal, wherein the second actuating means is mounted on the housing.

* * * * *